US012570158B2

(12) United States Patent
Lee

(10) Patent No.: US 12,570,158 B2
(45) Date of Patent: Mar. 10, 2026

(54) METHOD FOR SHIFT USING SHIFT ENTRY PREDICTION AND VEHICLE THEREFOR

(71) Applicants:Hyundai Motor Company, Seoul (KR); Kia Corporation, Seoul (KR)

(72) Inventor: Dong Gun Lee, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 239 days.

(21) Appl. No.: 18/215,417

(22) Filed: Jun. 28, 2023

(65) Prior Publication Data

US 2024/0198815 A1 Jun. 20, 2024

(30) Foreign Application Priority Data

Dec. 20, 2022 (KR) ........................ 10-2022-0179780

(51) Int. Cl.
| | |
|---|---|
| *B60L 15/20* | (2006.01) |
| *B60W 10/08* | (2006.01) |
| *B60W 10/11* | (2012.01) |
| *B60W 10/26* | (2006.01) |
| *B60W 30/18* | (2012.01) |
| *F16H 61/00* | (2006.01) |

(52) U.S. Cl.
CPC ......... *B60L 15/2045* (2013.01); *B60W 10/08* (2013.01); *B60W 10/11* (2013.01); *B60W 10/26* (2013.01); *B60W 30/18* (2013.01); *F16H 61/00* (2013.01); *B60L 2240/14* (2013.01); *B60L 2240/54* (2013.01); *B60L 2240/60* (2013.01); *B60L 2250/00* (2013.01); *B60L 2260/54* (2013.01); *B60W 2510/244* (2013.01); *B60W 2520/105* (2013.01); *B60W*

*2540/103* (2013.01); *B60W 2540/30* (2013.01); *B60W 2552/00* (2020.02); *B60W 2552/35* (2020.02); *B60W 2554/80* (2020.02); *B60W 2555/60* (2020.02); *B60W 2710/08* (2013.01); *B60W 2710/1005* (2013.01); *B60W 2710/248* (2013.01); *F16H 2061/0075* (2013.01)

(58) Field of Classification Search
None
See application file for complete search history.

(56) References Cited

U.S. PATENT DOCUMENTS

| | | | | |
|---|---|---|---|---|
| 2013/0291830 A1* | 11/2013 | Doering | ............... | B60W 20/40 |
| | | | | 123/350 |
| 2016/0264125 A1* | 9/2016 | Kanno | .................. | B60W 20/13 |
| 2017/0174219 A1* | 6/2017 | Omran | .................. | B60W 10/06 |
| 2018/0135744 A1* | 5/2018 | Kuang | ............. | B60W 50/0097 |
| 2018/0312158 A1* | 11/2018 | Morimoto | ................ | B60K 6/48 |
| 2019/0135280 A1* | 5/2019 | Kishi | ................ | B60W 40/1005 |
| 2019/0217859 A1* | 7/2019 | Konishi | .............. | B60W 30/143 |
| 2020/0122588 A1* | 4/2020 | Cserna | .................... | B60L 58/12 |

* cited by examiner

*Primary Examiner* — James J Lee
*Assistant Examiner* — Melanie G Huber
(74) *Attorney, Agent, or Firm* — Banner & Witcoff, Ltd.

(57) ABSTRACT

Disclosed herein a method for upshifting the transmission of a vehicle using shift entry prediction. The method may comprise predicting whether or not an upshift request of a vehicle will occur, determining whether or not a charge demand required for a battery through regeneration for upshift is greater than an allowable charge amount of the battery when the upshift request is predicted, controlling power consumption of the battery when the charge demand is greater than the allowable charge amount, and processing the upshift in response to an actual request of the upshift.

18 Claims, 9 Drawing Sheets

METHOD FOR SHIFT USING SHIFT ENTRY PREDICTION AND VEHICLE THEREFOR

CROSS-REFERENCE TO RELATED APPLICATION

The present application claims priority to Korean Patent Application No. 10-2022-0179780 filed Dec. 20, 2022, the entire contents of which are incorporated herein for all purposes by this reference.

BACKGROUND

Field

The present disclosure relates to a method for shifting a vehicle using shift entry prediction and, more particularly, to a shift method using shift entry prediction for minimizing upshift lag.

Discussion of the Background

Large transport vehicles loaded with heavy freight undergo frequent long-distance travels by using conventional fossil fuels as an energy source. Such transport vehicles may be mainly commercial vehicles such as buses, large trucks, and/or container trucks. However, as more vehicles that use environment-friendly energy sources have been demanded in recent years, even large vehicles are designed to operate on electric energy instead of fossil fuels. Like small vehicles, large vehicles may operate based on electric batteries mounted in the large vehicles. Additionally, the large vehicles may be fuel-cell electric vehicles that use a fuel cell together with an electric battery as the main energy source in order to satisfy performance requirements mainly associated with usage, weight, and driving distance.

Meanwhile, a battery-based vehicle may have a transmission mounted in the vehicle based on the usage and the weight of the vehicle. For example, a small vehicle may have no transmission. Speed may be increased in the small vehicle through an increase in motor torque, while speed may be decreased mainly with the vehicle's braking. Regeneration may be associated with the vehicle's breaking. On the other hand, a large vehicle may have a transmission, and the speed of the large vehicle can be increased by upshifting.

An electric vehicle with a transmission may use regeneration for braking and upshifting. An electric vehicle may use regeneration to synchronize its motor, which transfers a driving force to the wheels during the upshift. Specifically, when an upshift is requested, the motor and a shaft gear are separated from each other, and the torque of the motor may be reduced by regeneration to synchronize with a shaft gear for the upshift. Then, the motor with reduced torque and the shaft gear are coupled with each other, and upshift may be finally implemented when a constant torque of the motor is generated.

Regeneration may depend on an allowable or threshold charge amount of a high-voltage battery. For example, the saturated state of charge (SOC) of a high-voltage battery may not only lower an allowable charge amount but also reduce the charge limit of the high-voltage battery. As another example, such external factors as a low-temperature environment and abnormality (or failure) of a high-voltage battery may lower an allowable charge amount.

As described above, regeneration may be reduced along with a decrease in charge limit. This may delay synchronization between a moor and a shaft gear, thereby causing a shift lag. Furthermore, while regeneration for braking has an alternative means to reduce the torque of a motor, that is, a service brake, regeneration for upshift may have no alternative means to reduce the torque of the motor. Specifically, when the motor and the gear decouple from each other for upshift, the service brake cannot be involved in reducing the torque of the motor. In addition, since the service brake is applied only to braking for lowering the speed of a vehicle, it cannot be utilized for an upshift sequence. In other words, since there are no other means available than regeneration for reducing the motor torque for upshift, the allowable charge amount of a high-voltage battery may need to recover up to a level capable of accepting regeneration.

In order to increase an allowable charge amount of a high-voltage battery, upshifts may consume the power of the high-voltage battery by using a power-consuming device of a vehicle. Even when using such a power-consuming device, it may take considerable time to consume as much power as an allowable charge amount that enables a high-voltage battery to accept regeneration. Thus, there still remains the problem of shift lag in an electric vehicle.

SUMMARY

The present disclosure is technically directed to provide a shift method using shift entry prediction for minimizing an upshift lag and a vehicle using the method.

The technical objects of the present disclosure are not limited to the above-mentioned technical objects, and those that are not mentioned will be clearly understood by those skilled in the art through the following descriptions.

According to the present disclosure, a method of operating a vehicle is provided, where the method comprises predicting whether the vehicle will receive a request for an upshift, determining whether an amount of regenerative charge that will be produced based on the upshift satisfies an amount of allowable charge that can be transferred to a battery, of the vehicle, at a time point when the vehicle is predicted to receive the request for the upshift, controlling, based on the amount of regenerative charge satisfying the amount of allowable charge, power consumption of the battery, and, after receiving the request for the upshift, processing the upshift.

According to the present disclosure, predicting whether the vehicle will receive the request for the upshift may comprise determining whether an acceleration condition, associated with the upshift, is satisfied based on driving patterns of a user of the vehicle, information associated with past routes traveled by the vehicle, or information associated with traffic near the vehicle, and predicting the time point based on a second time point when the acceleration condition is satisfied.

According to the present disclosure, controlling of the power consumption of the battery may comprises estimating, based on driving patterns of a user of the vehicle, information associated with past routes traveled by the vehicle, and information associated with traffic near the vehicle, a point, on the current route, where the vehicle will start accelerating, and performing the controlling of the power consumption of the battery before the point is reached by the vehicle.

According to the present disclosure, predicting whether the vehicle will receive the request may be further based on determining, based on information associated with a current route of the vehicle, information associated with a road on the current route, and information associated with traffic near the vehicle, whether an acceleration associated with the upshift is permitted on the current route, and determining whether a request for acceleration of the vehicle satisfies a threshold condition.

According to the present disclosure, the information associated with the road on the current route may comprise at least one of a speed limit, a lane size, a lane curvature, or a road surface condition.

According to the present disclosure, the request for acceleration may be based on a manipulation of an acceleration module of the vehicle by a user of the vehicle, and determining whether the request for acceleration satisfies the threshold condition may comprise determining that a manipulation amount of the user satisfies a threshold value.

According to the present disclosure, the controlling of the power consumption of the battery may be further based on increased speed of the vehicle caused by the request for acceleration satisfying the threshold condition.

According to the present disclosure, predicting whether the vehicle will receive the request for the upshift may be further based on determining whether a requested constant speed is higher than a current speed of the vehicle, and determining whether a shift speed, associated with the upshift, exists between the requested constant speed and the current speed.

According to the present disclosure, the method further comprising predicting that the vehicle will not receive a request for a second upshift based on a second shift speed, associated with the second upshift, does not exist between a requested constant speed and a current speed of the vehicle and the second shift speed is higher than the requested constant speed, determining whether an amount of second regenerative charge associated with the second shift speed is greater than the amount of allowable charge, and controlling, based on the amount of second regenerative charge being greater than the amount of allowable charge, second power consumption of the battery.

According to the present disclosure, controlling of the second power consumption of the battery may comprise controlling the second power consumption of the battery to be lower than a difference between the amount of second regenerative charge and the amount of allowable charge.

Effects obtained in the present disclosure are not limited to the effects mentioned above, and other effects not mentioned above may be clearly understood by those skilled in the art from the following description.

The features briefly summarized above for this disclosure are only exemplary aspects of the detailed description of the following disclosure and are not intended to limit the scope of the disclosure.

The technical problems solved by the present disclosure are not limited to the above technical problems, and other technical problems which are not described herein will be clearly understood by a person (hereinafter referred to as an ordinary technician) having ordinary skill in the technical field, to which the present disclosure belongs, from the following description.

DETAILED DESCRIPTION

Figure 1:
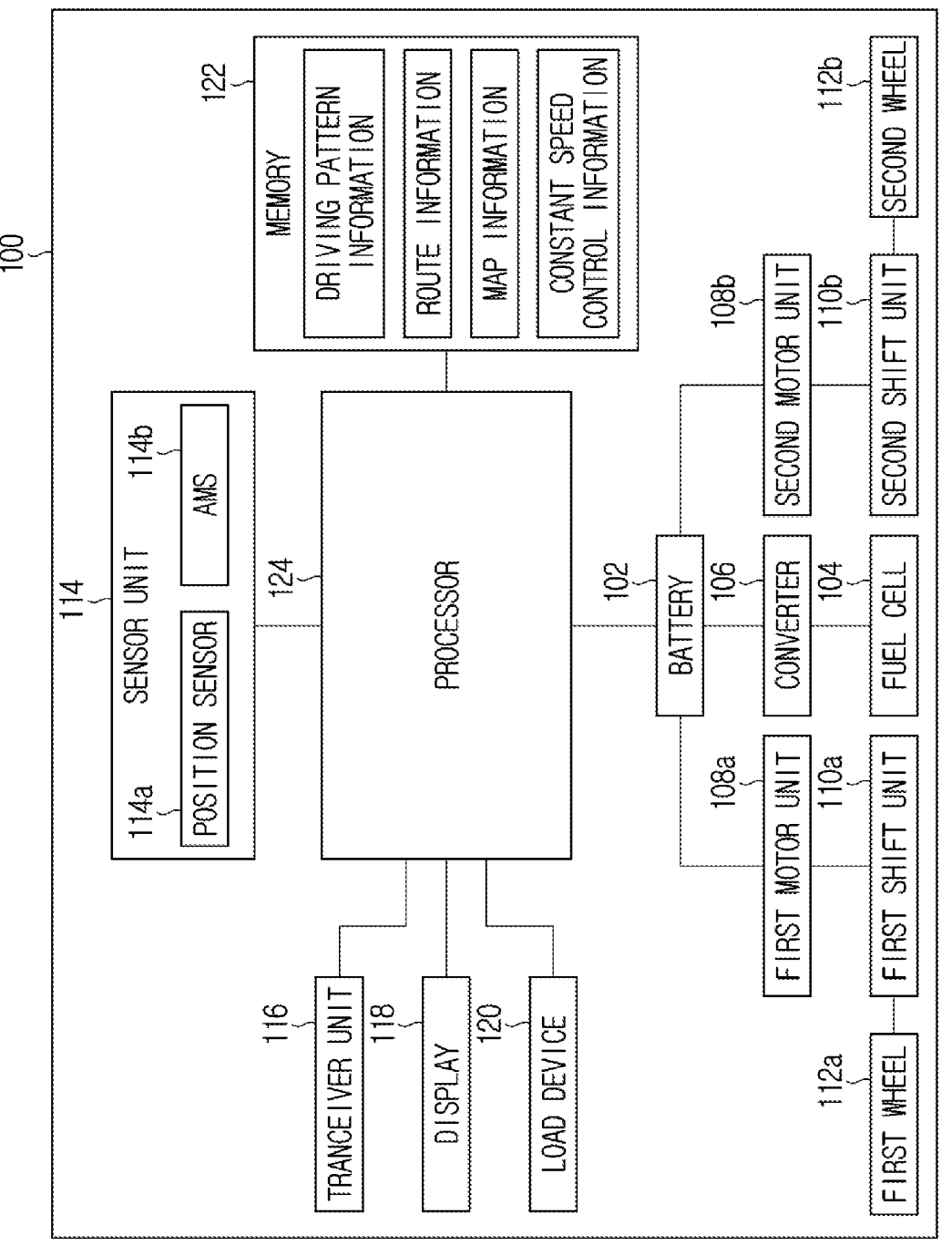
FIG. 1 shows modules constituting an example vehicle according to the present disclosure.

Hereinafter, examples will be described in detail with reference to the accompanying drawings. However, the present disclosure may be implemented in various different ways and is not limited to the examples described therein.

In describing the examples of the present disclosure, well-known functions or constructions will not be described in detail since they may unnecessarily obscure the understanding of the present disclosure. The same reference numerals will refer to the same or like parts, and redundant descriptions of the same elements will be omitted.

In the present disclosure, when an element is simply referred to as being "connected to," "coupled to," and/or "linked to" another element, the element may be "directly connected to," "directly coupled to," and/or "directly linked to" the other element or is connected to, coupled to or linked to another element with the other element intervening therebetween. In addition, when an element "includes" or "has" another element, the element may further include the other element without excluding another component unless specifically stated otherwise.

In the present disclosure, the terms first, second, etc., are only used to distinguish one element from another and do not limit the order or the degree of importance between the elements unless specifically mentioned. Accordingly, a first element in an example could be termed a second element in another example. Similarly, a second element in an example could be termed a first element in another example without departing from the scope of the present disclosure.

In the present disclosure, elements distinguished from each other are for clearly describing different features and do not necessarily mean that the elements are separated. In other words, a plurality of elements may be integrated into one hardware or software unit, or one element may be distributed and formed in a plurality of hardware or software units. Therefore, even if not mentioned otherwise, such integrated or distributed examples are included in the scope of the present disclosure.

In the present disclosure, elements described in various examples do not necessarily mean essential elements, and some of them may be optional elements. Therefore, an example composed of a subset of elements described in another example is also included in the scope of the present disclosure. In addition, examples including other elements in addition to the elements described in the various examples are also included in the scope of the present disclosure.

The advantages and features of the present invention and the way of attaining them will become apparent with reference to the examples described below in conjunction with the accompanying drawings. Examples, however, may be embodied in many different forms and should not be construed as being limited to example examples set forth herein. Rather, these examples are provided so that this disclosure will be complete and fully convey the invention's scope to those skilled in the art.

In the present disclosure, each of phrases such as "A or B," "at least one of A and B," "at least one of A or B," "A, B or C," "at least one of A, B, and C," "at Each of the phrases such as "at least one of A, B or C" and "at least one of A, B, C or combination thereof" may include any one or all possible combinations of the items listed together in the corresponding one of the phrases.

In the present disclosure, expressions of location relations used in the present specification such as "upper," "lower," "left," and "right" are employed for the convenience of explanation, and in case drawings illustrated in the present specification are inversed, the location relations described in the specification may be inversely understood.

Hereinafter, examples of the present disclosure will be described with reference to the accompanying drawings.

Referring to FIG. 1, an example vehicle that may process shift controls by predicting a shift entry is described hereinafter. FIG. 1 shows example modules constituting the vehicle according to an example of the present disclosure.

For example, a vehicle 100 may refer to a device capable of moving. The vehicle 100 may be a normal passenger, a commercial vehicle, a mobile office, and/or a mobile hotel. The vehicle may be a four-wheel vehicle, for example, a sedan, a sports utility vehicle (SUV), and/or a pickup truck. Additionally, the vehicle 100 may also be a vehicle with five or more wheels, for example, a lorry, a container truck, and/or a heavy vehicle. The vehicle 100 may be operated by humans or via autonomous driving (semi-autonomous or full-autonomous).

The vehicle 100 may be a moving object driven based on electric energy. Specifically, the vehicle 100 may employ an electric battery capable of being directly charged or a gas-based fuel cell as an energy source. As for a fuel cell, the vehicle 100 may use various types of gas capable of generating electric energy in the fuel cell, and the gas may be hydrogen, for example. However, the gas is not limited thereto, and various types of gas may be applied. In the present disclosure, a fuel cell-based vehicle 100 will be described as an example among the different vehicles using electric energy. However, the present disclosure may also be applied to a vehicle driven only by an electric battery.

The vehicle 100 may run by utilizing a first battery with a high voltage output and a second battery with a low voltage output, implementing operations of various load devices. Hereinafter, for convenience of description, a first battery and a second battery will be described, by way of example, to be a battery 102 and a fuel cell 104, respectively. However, the present disclosure may be applicable to any vehicle that has heterogeneous types of first and second batteries and/or employs a method of charging the first battery, which outputs power for starting the vehicle, and the power for driving the vehicle is generated by the second battery.

The battery 102 and/or the fuel cell 104 may constantly supply power, or the battery 102 and the fuel cell 104 may be used as a main power source and an auxiliary power source, respectively.

The battery 102 may be a pure electric battery and be configured as a secondary cell charged with electric energy. As another example, the battery 102 may be configured as a secondary cell with a higher energy density than that of the fuel cell 104 and thus is chargeable to a larger capacity. When compared to the battery 102, the fuel cell 104 may be configured to have an output at a low voltage but with a higher energy density or a larger charge capacity. For example, the fuel cell 104 may be configured as a hydrogen-based fuel cell that generates electric energy through a reaction between hydrogen gas filled into a tank (not illustrated) from outside and oxygen flowing from an air blower (not illustrated).

The battery 102 may be charged by receiving a voltage outputted by a converter 106 that converts power stored in the fuel cell 104. In addition, the converter 106 may supply power to motors of first and second motor units 108a and 108b and/or a load device 120, which are operated in a high voltage range and/or based on the voltage converted from the fuel cell 104.

In addition, the vehicle 100 may include the first and second motor units 108a and 108b, first and second shift units 110a and 110b, and/or first and second wheels 112a and 112b.

In the present disclosure, the first and second wheels 112a and 112b are illustrated to function as if the vehicle 100 is on a 4-wheel drive, and the first and second wheels 112a and 112b may be rotated by receiving power from the first and second motor units 108a and 108b. However, the vehicle 100 may have more than 4 wheels. In this case, all the wheels may be rotated by being connected with, by way of example, a motor unit. As another example, only some of the wheels may be connected to the motor unit, and wheels not connected to the motor unit may be rotated by the wheels that are rotated by a motor.

The first and second motor units 108a and 108b may generate a driving force by receiving power from the battery 102. When the first and the second motor units 108a and 108b transfer a driving force to the first and the second wheels 112a and 112b, the first and the second wheels 112a and 112b may be driven to rotate. For example, the first and the second motor units 108a and 108b may have a motor control module capable of controlling a motor, which transfers a driving force to the first and the second wheels 112a and 112b, a motor torque, and/or a direction of motor rotation. Additionally, when the brake of the vehicle 100 is applied, the motor control module may stop the first and the second wheels 112a and 112b from rotating and/or slow the rotations. The first and the second motor units 108a and 108b may be driven by power, received from the battery 102 via an inverter (not illustrated). An inverter may convert a specific form of power, for example, an alternating current, to another form, that is, a direct current, and reduce a voltage.

The first and the second shift units 110a and 110b may shift a driving force of the first and the second motor units 108a and 108b and transfer the shifted driving force to the first and second wheels 112a and 112b. For example, the first and the second shift units 110a and 110b may have various components for shifting the driving force in response to an upshift request to increase the speed of the vehicle 100 and a downshift request for deceleration or braking. For example, a component may have a shaft gear comprising a plurality of stages to be coupled with the motor units 108a and 108b and various gears to be coupled with the wheels 112a and 112b. The first and the second shift units 110a and 110b may be configured as an assembly module configured as a combination of the gears. For example, an upshift request or a deceleration/braking request may be a request generated by a processor 124 in response to a speed reached during driving, which corresponds to a shift level. As another example, an upshift request or a deceleration/braking request may be a request generated by a driver's (or user)'s manipulation during driving. Accordingly, the first and the second shift units 110a and 110b may couple a gear corresponding to a shift stage according to the request, and the motor units 108a and 108b may transfer a driving force, which is shifted according to the shift stage, to the wheels 112a and 112b.

In addition, the vehicle 100 may include a sensor unit 114, a transceiver unit 116, a display 118, a load device 120, a memory 122, and/or the processor 124.

The sensor unit 114 may have various types of sensor modules for detecting various states and situations that occur inside the vehicle 100 and/or in an external environment. For example, the sensor unit 114 may include a position sensor 114a for measuring the position of the vehicle 100 and/or an acceleration module sensor 114b for detecting a user's manipulation amount for an acceleration module of the vehicle 100. Although not illustrated, the sensor unit 114 may include an image sensor, which provides a visual image of an interior or exterior of a vehicle, a LiDar, a radar sensor, a distance sensor, an acceleration sensor, a wheel speed sensor, and/or a gyro sensor for detecting the posture and orientation of the vehicle 100. The present disclosure mainly describes sensors, which are referred to in describing the example vehicle 100, but may further include a sensor for detecting various situations not listed herein.

The position sensor 114a may measure two-dimensional positions and altitudes of the vehicle 100 that is being parked or driven. For example, the position sensor 114a may be a GPS sensor, and the GPS sensor may determine a position of the vehicle 100 based on information transmitted from a plurality of satellites. The position sensor 114a is not limited to a GPS sensor and may be configured as a plurality of sensors combined with other sensors, including the GPS sensor.

The acceleration module sensor 114b may detect a manipulation amount for an acceleration module (not illustrated) of the vehicle 100 used by a user in order to satisfy the user's request or intention for speed-up. For example, an acceleration module may be an accel pedal, hardware, or software for acceleration, and a user may control the vehicle 100 at a desired speed through the acceleration module. In the case of an accel pedal, the acceleration module sensor 114b may be an accel pedal position sensor (APS).

The transceiver unit 116 may support mutual communication with a moving object around a vehicle, such as a traffic intelligence service server, a roadside unit, a server providing various vehicle services, and/or an edge device. Through the transceiver unit 116, the vehicle 100 may externally transmit and receive data that is managed or generated by a method described in the present disclosure. For example, the transceiver unit 116 may obtain a position of the vehicle 100, traffic information around the vehicle 100, weather information, and/or detailed information about road infrastructure on a route.

The display 118 may function as a user interface. The display 118 may display, by means of the processor 124, may present the operation state, control state, route/traffic information, battery state, remaining gas information of the vehicle 100, and/or other contents requested by a user. The display 118 may be configured to be a touch screen capable of detecting a user input to receive a user's request, giving a command to the processor 124.

The load device 120 is a device, which is mounted in the vehicle 100 to implement a predetermined function of the vehicle 100. The load device 120 may comprise an air-conditioning system, a braking system, a start-up system, a drive transmission system, a lighting system, and/or various devices installed in the vehicle 100. For example, an air-conditioning system may include an air-conditioner using a heater and an electric heat pump (EHP) to maintain the interior of the vehicle 100 at a predetermined temperature. A braking system may include a device that performs controls associated with regeneration according to a user's braking request, a motor torque, downshift, etc. The braking system may include a module (e.g., a brake resistor) for consuming a residual voltage of the battery 102 during regeneration.

The load device 120 may have a power-consuming device that uses up the power of the battery 102 in order to increase an allowable charge amount of the battery 102, when an upshift request is predicted. A separate power-consuming device may be provided, but a specific device/module of an air-conditioning system or a braking system, which uses high power, may be available. For example, a power-consuming device may include at least one of a brake resistor, a heater, and/or an EHP.

The memory 122 may store an application for controlling the vehicle 100 and various data associated with the vehicle 100. The memory 122 may load the application or read and record data at the request of the processor 124. In the present disclosure, for example, the memory 122 may include driving pattern information of a user of the vehicle 100, information on past routes of the vehicle 100, and map information for recognizing a current driving route. In addition, when there is a user's request for constant speed control, the memory 122 may manage constant speed control information according to the request. For example, a constant speed control request is generated when a user enables a function like cruise control, and/or the vehicle 100 may be controlled to run at a constant speed based on a speed designated by the user and a surrounding driving situation.

Driving pattern information may be information learned based on a user's acceleration pattern and shift pattern while the user was driving on a past route. For example, a shift pattern may be learned from acceleration, including a shifted speed or a user's manipulation. For example, a shift pattern may include an average shift level that is normally used on a specific route and in a specific driving situation.

In addition, driving pattern information may be pattern information associated with a user's driving control, which is learned based on at least one of a past route, a type of fellow passenger, a traffic situation, a specific event, and detailed information on road infrastructure on a route. Additionally, the driving pattern information may include information about the types of fellow passengers in the vehicle, how vulnerable the fellow passengers were in the past route, and/or whether the normal passengers were affected by a predetermined level of sudden acceleration or sudden braking, and the like.

A traffic situation may be a state information associated with a flow of vehicles at a specific point of a route. For example, a traffic situation may include information regarding whether or not congestion occurs at the specific point due to a neighboring vehicle, a pedestrian, and/or other surrounding objects. A specific event is event information caused by an external factor occurring on a route, and it may include information on, by way of example, weather, accidents, and/or construction/maintenance works. Detailed information on road infrastructure may include information on the structure and condition of road infrastructure on a route, restrictions applied to the infrastructure, and the like. For example, the structure of road infrastructure may include the number of lanes, a size of a lane, and/or lane curvatures. For example, the condition of road infrastructure may include a road surface condition. For example, the restrictions may include information associated with a type of the vehicle 100, a speed limit according to a load, and/or an available lane.

As an example, driving pattern information may be a user's pattern of passing a specific intersection along a predetermined path on a past route and then shifting the vehicle 100 for acceleration. As another example, if the vehicle is driven when congestion occurs around a specific intersection, a user's pattern may pass the intersection and the congested area and then shift the vehicle 100 for acceleration. As another example, if the vehicle 100 stops at a station on a predetermined path and then starts, a user's pattern may shift the vehicle 100 for acceleration. As yet another example, in case the vehicle 100 passes an interchange or a junction and enters a high-speed section, a user's pattern may be shifting the vehicle 100 for acceleration according to a type of fellow passenger also present in the vehicle 100, a traffic situation, and/or a specific event. A high-speed section may be a motorway or highway where the vehicle 100 of a specific type is allowed to operate at high speed. As yet another example, a user's pattern may be shifting the vehicle 100 for acceleration on a long downhill, that is a ramp with a predetermined distance. A user's pattern may also shift the vehicle 100 for acceleration based on a surrounding traffic situation and/or details of the road structure.

The above examples of driving pattern information have been described with a focus on a regular route vehicle running on a predetermined route, that is, a fixed path, but driving pattern information may also be generated for the vehicle 100, which has a driving history on a non-regular route, through the learning of various types of information accumulated through driving on past routes.

Route information may accumulate various information associated with a user's past routes. For example, in the case of a regular route vehicle, route information may include information on a route through a repeated route pattern or a predetermined input. When the vehicle 100 is driven not on a specific regular route but on a random route, route information may be accumulated by collecting a same or similar route from accumulated past routes. In addition, through learning of information associated with every past route which the vehicle ran, route information may include road infrastructure information for each route. When such route information is managed in association with driving pattern information, a user's behavior, like an acceleration pattern on a specific route, may be inferred.

The map information may show a current driving route and provide a position of the vehicle 100 on the driving route by using the position sensor 114*a*. For example, map information may have map network information in road and lane units and include information on road infrastructure and static objects associated with the map network information.

The application stored in the memory 122 may be configured to predict, based on the above-described information, whether or not an upshift request of the vehicle 100 will occur and generate at least one instruction for controlling the power consumption of the battery 102 according to a charge demand of the battery 102 required by regeneration and/or a current allowable charge amount of the battery 102.

The processor 124 may perform overall control of the vehicle 100. The processor 124 may be configured to execute the application stored in the memory 122 and/or the instructions generated by the application. The processor 124 may have at least one processing module. Each control-related function may be implemented in a single processing module or a corresponding processing module among a plurality of modules. According to the present disclosure, the processor 124 may control the power consumption of the battery 102 for regeneration according to a prediction result of an upshift request by using an application, an instruction, and/or data stored in the memory 122.

A shift method, according to the present disclosure, may be implemented at least by the first and second motor units 108*a* and 108*b*, the first and second shift units 110*a* and 110*b*, the memory 122, and/or the processor 124. More simply, a series of processing using at least the memory 122 and the processor 124 may be performed for a method according to the present disclosure. More specifically, the processing may be implemented by the processor 124. The above-described processing of the processor 124 will be described in detail through FIG. 2 to FIG. 7.

Figure 2:
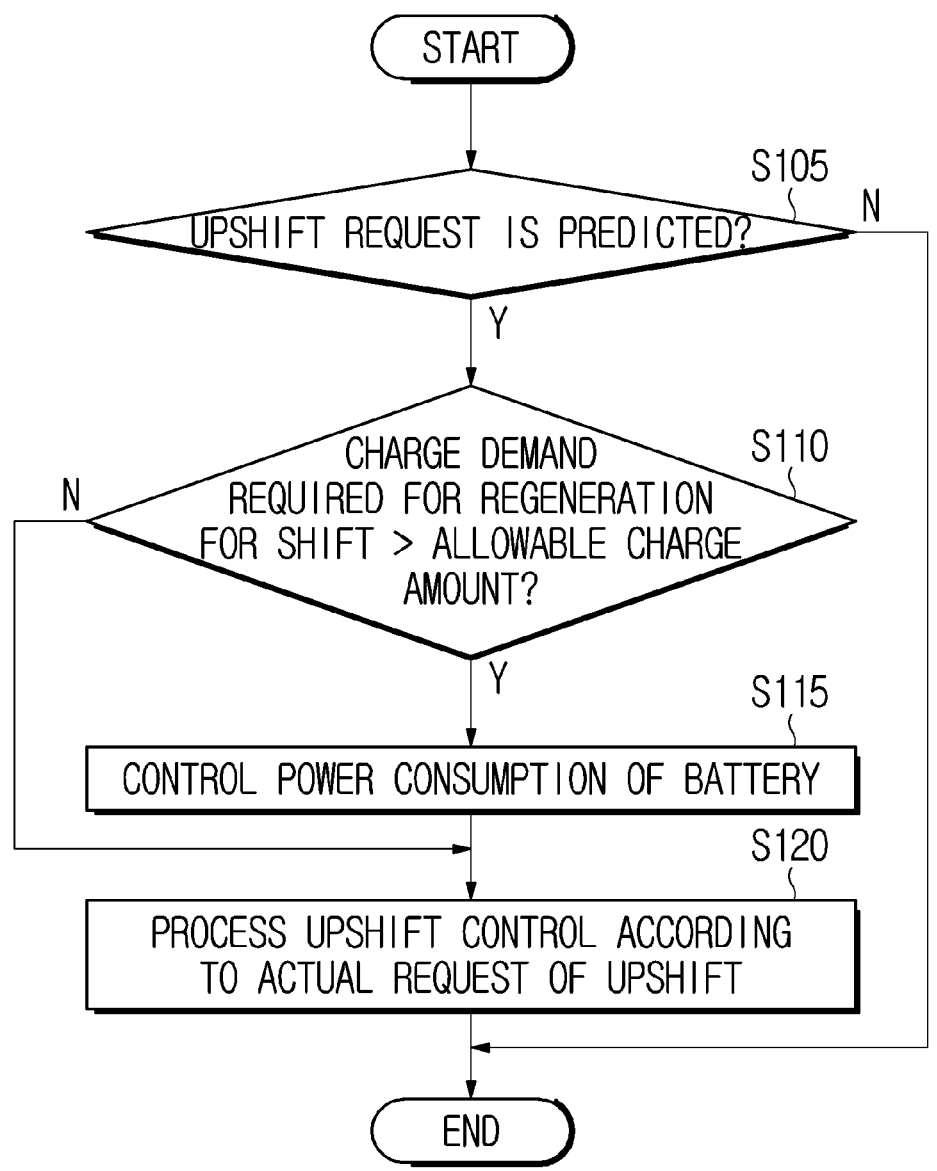
FIG. 2 is a flowchart of an example method for shifting according to the present disclosure.
Figure 3:
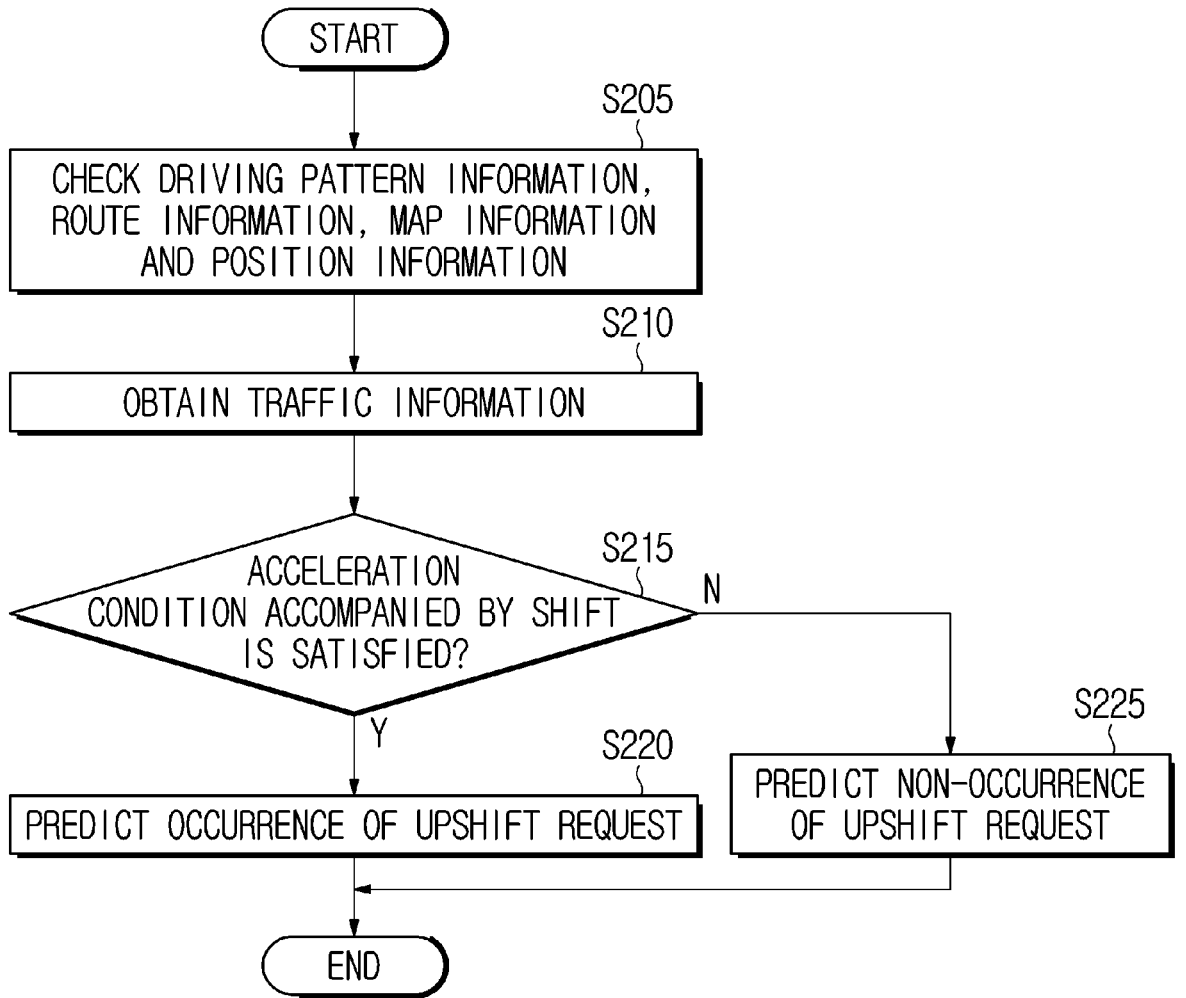
FIG. 3 is a flowchart showing an example process of predicting an upshift.
Figure 4:
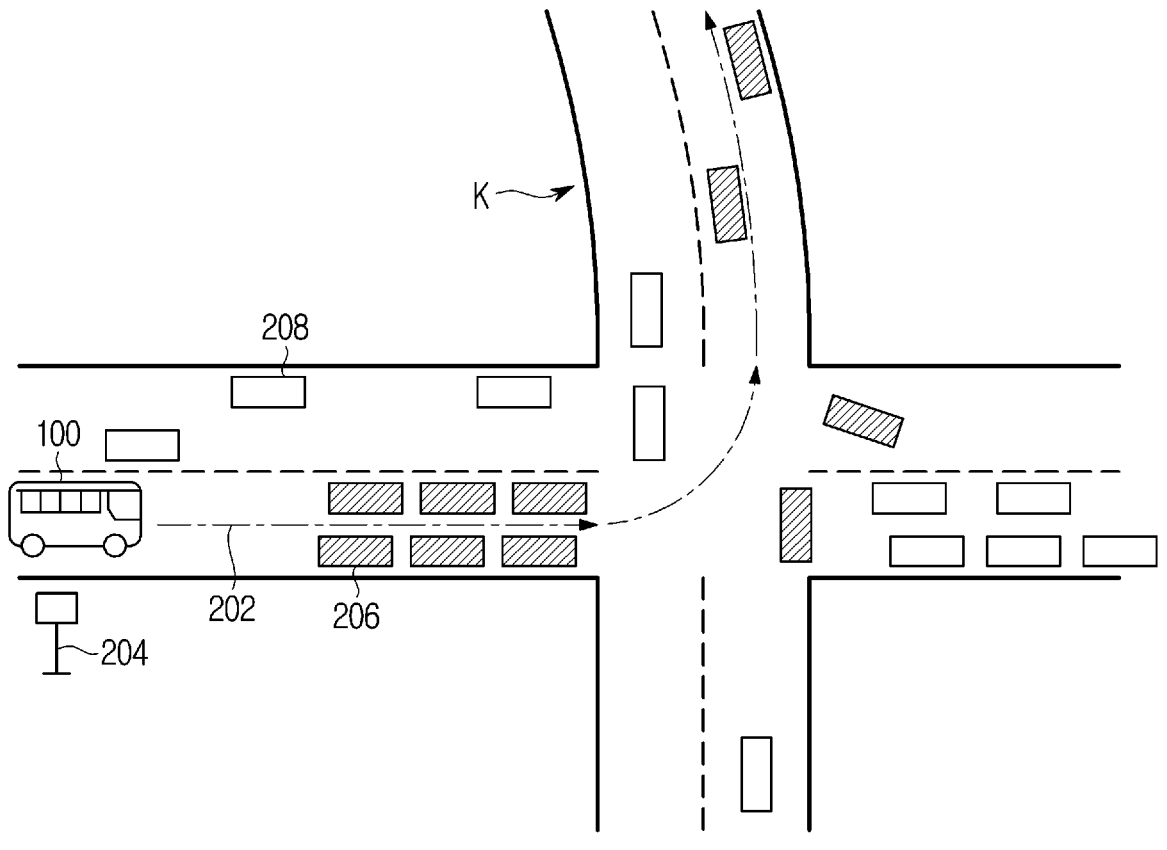
FIG. 4 shows an example driving route requiring a prediction of an upshift.

Referring to FIG. 2 to FIG. 4, a shift method using shift entry prediction according to another example of the present disclosure will be described in detail. FIG. 2 is a flowchart of an example method for shifting. For the convenience of description, in the present disclosure, the vehicle 100 is exemplified as a moving object in a regular route, but the present disclosure may also be applied to the vehicle 100, which has a history of driving on a random route or has various driving pattern information as discussed in relation to FIG. 1.

First, the processor 124 may predict whether or not an upshift request will occur based on a user's driving pattern for the vehicle 100, the position of the vehicle 100, and/or traffic information (S105).

As for the step S105, FIG. 3 and FIG. 4 will be described by way of example. FIG. 3 is a flowchart showing an example of a prediction process of the upshift. FIG. 4 is a view illustrating an example driving route where an upshift will be predicted.

First, the processor 124 may check the driving pattern information of a user using the vehicle 100, past route information, map information, and/or position information (S205).

In the case of a regular route vehicle, route information may include a predetermined route and/or provide a past route corresponding to a current driving route 202, as exemplified in FIG. 4. Based on the data of the position sensor 114*a* and/or map information, information about the position of the vehicle may be identified as a position near a station 204, as exemplified in FIG. 4.

Driving pattern information may be determined based on the route information and/or driving situation of the vehicle 100. A driving situation may be obtained from an image of the sensor unit 114 mounted in the vehicle 100, LiDar, and/or a current speed. Additionally, the driving situation may be inferred based on data obtained from an external device. As an example, the external device may include at least one of a neighboring vehicle, a roadside unit, and/or a traffic control server.

Specifically, the processor 124 may identify and confirm, in the memory 122, driving pattern information corresponding to the route and situation of FIG. 4. The driving pattern information thus confirmed may include a driving pattern near the station 204, a driving pattern near the intersection exemplified in FIG. 4, and/or a driving pattern in a high-speed driving section. Herein, it is assumed that a part of driving pattern information includes a pattern of shifting the vehicle 100 by acceleration, when starting the vehicle 100 after a stop at the station. In addition, it is assumed that, in case the vehicle 100 is driven at a time when congestion occurs around a specific intersection, a part of driving pattern information may include a user's pattern of passing the specific intersection and the congested area and then shifting the vehicle 100 by acceleration. In addition, it may be assumed that a part of driving pattern information includes a pattern of shifting the vehicle 100 by acceleration when the vehicle 100 enters a high-speed section according to a type of a fellow passenger, a traffic situation, and/or a specific event.

Next, the processor 124 may obtain traffic information associated with a current position of the vehicle 100 and/or a route ahead of the vehicle 100 (S210).

Traffic information may include information associated with a flow of vehicles based on the congestion due to neighboring vehicles, an event, and/or a restriction at a current position, where the vehicle 100 is located, and on a route ahead. An event may be caused by an external factor and may be, for example, weather, an accident, and/or construction/maintenance work. A restriction may include, for example, detailed information on the speed limit and road infrastructure.

Traffic information may be obtained from an image captured by the sensor unit 114 of the vehicle 100, one or more LiDars, and/or a current speed, or may be obtained from an external device. As an example, the external device may include at least one of a neighboring vehicle, a roadside unit, and/or a traffic control server.

In the example of FIG. 4, traffic information may show a congested situation caused by the neighboring vehicles 206 running in the same direction as the vehicle 100 before entering an intersection. In addition, traffic information may show that the congestion occurs at an already identified congestion hour. In addition, traffic information may show a smooth traffic flow on a left-turn road at the intersection. The traffic information may show that the neighboring vehicle 208 moves freely in the opposite direction to the vehicle 100.

Referring back to FIG. 3, the processor 124 may determine whether or not an accompanying acceleration condition accompanied by an upshift is satisfied, based on driving pattern information, route information, position information, and/or traffic information (S215).

As for an example position of the vehicle 100 running by the station 204, traffic information shows a smooth flow state on the route 202 ahead of the vehicle 100 near the station 204. For example, a flow state may be calculated as a congestion rate due to the neighboring vehicles 206. When the congestion rate is equal to or below a predetermined value, the flow state may be determined to be smooth. The processor 124 may determine that the accompanying acceleration condition accompanied by upshift is satisfied, based on the position of the vehicle 100, driving pattern information that the vehicle 100 is shifted by acceleration after stopping at the station 204, and/or traffic information of the above-described state. Accordingly, the processor 124 may determine that an upshift request is predicted to occur (S220).

As for an example position of the vehicle 100 running towards an intersection, traffic information shows a congested state on the route 202 before the intersection. The processor 124 may predict deceleration based on the position of the vehicle 100, driving pattern information of slowly moving in congested areas, and/or traffic information of the above-described state. That is, the processor 124 may determine that an acceleration condition accompanied by an upshift is not satisfied, by considering the position of the vehicle 100 and/or the traffic information. Accordingly, the processor 124 may determine that no upshift request occurs (S230).

As for an example position of the vehicle 100 driving toward the intersection to take the left-turn route 202, traffic information may show a smooth flow state on the left-turn route 202. The processor 124 may determine that the acceleration condition is satisfied, based on the position of the vehicle 100, driving pattern information that the vehicle 100 is shifted by acceleration after passing the intersection, and/or traffic information of the above-described state. Accordingly, like at step S220, the processor 124 may determine that an upshift request is predicted to occur.

Referring to FIG. 2 again, when an upshift request is predicted, the processor 124 may determine whether or not a charge demand, which is required for the battery 102 for the regeneration for upshift, is greater than an allowable charge amount of the battery 102 (S110).

The charge demand may be calculated as a regeneration amount based on an upshift level accompanying predicted accelerated driving, that is, a shift level of the shift units 110a and 110b. Specifically, since a temporary reverse motor torque for an upshift level causes regeneration for the battery 102, the charge demand may correspond to the regeneration amount.

If the charge demand is greater than the allowable charge amount, the processor 124 may perform processing to control the power consumption of the battery (S115).

As for power consumption processing, the processor 124 may estimate a point on a driving route when the vehicle 100 would start accelerating based on driving pattern information, route information, and/or traffic information and perform power consumption control of the battery 102 before reaching the acceleration point.

As shown in FIG. 4, in an example position of the vehicle 100 driving by the station 204, an acceleration point may be a point on the route 202 ahead of the station 204 and/or be a point on the route 202 where a request of upshift is estimated. For example, a request for upshift may be generated since a shift speed is reached, and the shift speed may be a speed at which upshift occurs due to acceleration. For example, to execute the request of upshift at the acceleration point, the processor 124 may control the power consumption of the battery 102 at a consumption point between the station 204 and the acceleration point. As another example, the processor 124 may estimate a time of arriving at the consumption point from the station 204, based on traffic information and/or driving pattern information, and control the power consumption of the battery 102 at the estimated arrival time at the consumption point.

The power consumption of the battery 102 may be controlled by a power amount based on a difference between a charge demand and an allowable charge amount. Specifically, a power amount to be consumed may be set to a value equal to or greater than a difference between a charge demand and an allowable charge amount. In addition, power consumption may be controlled to reach a charge demand at an acceleration point.

In addition, for power consumption, the processor 124 may provide the power of the battery 102 to a power-consuming device. The processor 124 may select a power-consuming device by considering the power amount to be consumed and a required power amount of each consuming device. Thus, before arriving at an acceleration point or even before its arrival time, the processor 124 may consume the power of the battery 102 beyond a charge demand by using the selected power-consuming device.

A separate power-consuming device may be provided, but a specific device/module of an air-conditioning system or a braking system, which uses high power, may be available.

For example, a power-consuming device may include at least one of a brake resistor, a heater, and/or an EHP.

Next, in response to an actual request for upshift according to a user's acceleration manipulation, the processor 124 may perform the upshift by controlling the first and second motor units and the first and second shift units 110*a* and 110*b* (S120).

The actual request of upshift may occur at an acceleration point (or shift point) estimated by the processor 124 or near the point. In case a request for upshift actually occurs, motors of the motor units 108*a* and 108*b* and shaft gears of the shift units 110*a* and 110*b* are separated from each other, and the torque of a motor may be reduced by regeneration to synchronize with a shaft gear for the upshift. Then, the motor with reduced torque and the shaft gear are coupled with each other, and the upshift may be finalized by the occurrence of a constant torque of the motor.

Meanwhile, at step S110, if a charge demand is equal to or smaller than an allowable charge amount, the processor 124 may not perform power consumption of the battery 102. When the processor 124 receives the actual request for the upshift, the processor 124 may perform the upshift as at step S120.

Figure 5:
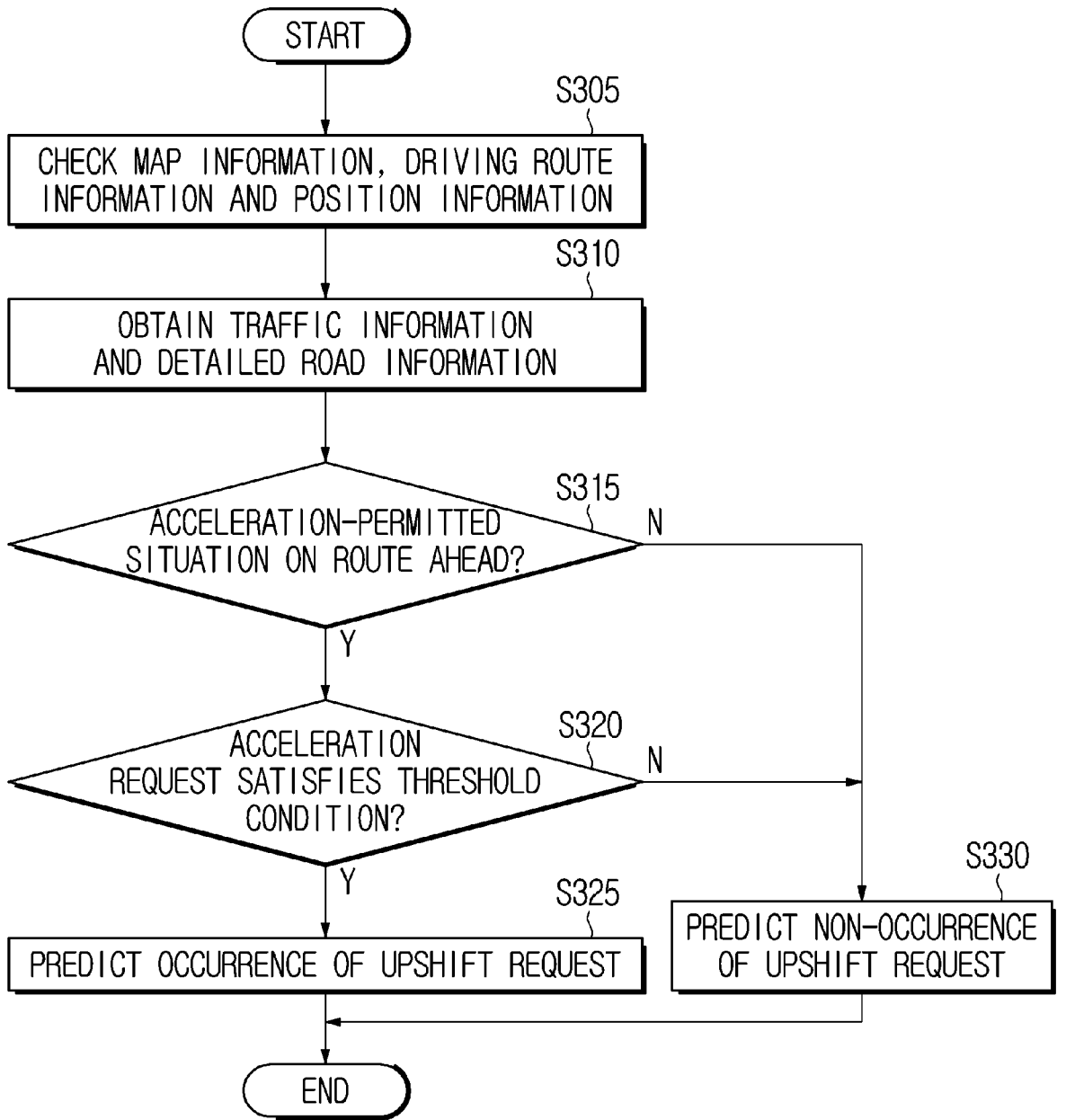
FIG. 5 is a flowchart showing another example process of predicting an upshift.

Hereinafter, another example of a prediction process of upshift according to step S105 of FIG. 2 will be described with reference to FIG. 5. In the present disclosure, the process of FIG. 5 is different from that of FIG. 3, but steps S110 to S120 of FIG. 2 may be identical. However, a difference from what is described at steps S110 and S120 will be described. The present disclosure is applicable to the vehicle 100, which may be on a regular route or a non-regular route.

First, the processor 124 may check map information, driving route information, and/or current position information of the vehicle 100 (S305).

Driving route information is route information, which a user requests to the vehicle 100 for current driving, and may include global and/or local routes of the vehicle 100, which is currently being driven, based on map information and a traffic situation. The map information and/or position information may be the same as described in FIG. 3.

Next, the processor 124 may obtain traffic information and/or detailed road information associated with a current position of the vehicle 100 and the route ahead of the vehicle 100 (S310).

The traffic information may be the same as described in FIG. 3. Like detailed information of road infrastructure, the detailed road information may include information on the structure and condition of a road on the route and/or a restriction applied to the road. For example, the structure of a road may include the number of lanes, a size of a lane, and/or a lane curvature. For example, the condition of a road may include a road surface condition. For example, the restriction may include information associated with a type of the vehicle 100, a speed limit according to a load, and/or an available lane.

Next, the processor 124 may determine whether or not an acceleration-permitted situation accompanied by an upshift exists on a driving route based on driving route information, detailed road information, and/or traffic information (S315).

Referring to the example of FIG. 4, when the vehicle 100 takes a left at the intersection and then is located at an entry point on an upward road of FIG. 4, traffic information may show a smooth flow state on the route 202 ahead of the entry point. For example, a flow state of traffic information is calculated as a congestion rate, of which the description may be the same as FIG. 3. In addition, detailed road information shows a lane curvature radius (K) that enables driving up to a predetermined speed.

The processor 124 may primarily check traffic information of a smooth state and thus determine whether or not there is an acceleration-permitted situation on the route 202 ahead. In the example of FIG. 4, traffic information shows the presence of an acceleration-permitted situation.

Next, the processor 124 may secondarily check detailed road information and thus determine whether or not there is an acceleration-permitted situation on the route 202 ahead. In the example of FIG. 4, detailed road information includes a lane curvature radius (K), and since the lane curvature radius (K) is equal to or below a maximum drivable curvature according to the current speed of the vehicle 100, it may show that an acceleration-permitted situation exists according to the detailed road information.

Next, the processor 124 may consider traffic information, detailed road information, and/or a road distance on the driving route 202 and finally determine whether or not there is an acceleration-permitted situation by checking whether or not speed-up driving accompanied by upshift is possible.

If there is an acceleration-permitted situation exists on a route ahead, the processor 124 may determine whether or not an acceleration request from a user satisfies a threshold condition (S320).

The acceleration request may be based on the user's manipulation of an acceleration module of the vehicle 100. When the user's manipulation amount is equal to or greater than a threshold value, it may be determined that the acceleration request satisfies the threshold condition.

For example, the acceleration module may be an accel pedal and hardware or software for acceleration. If the acceleration module is an accel pedal, the acceleration module sensor 114*b* may be an accel pedal position sensor (APS). In order to check the user's request or intention for acceleration, the processor 124 may check a position of an accel pedal through the acceleration module sensor 114*b*. If the position of the accel pedal is equal to or greater than a predetermined threshold value, the processor 124 may determine that the acceleration request satisfies a threshold condition. Determination about the satisfaction of a threshold condition by an acceleration request is not limited to the above-described example and may be performed in various ways.

Next, when an acceleration request satisfies a threshold condition, the processor 124 may determine that the occurrence of an upshift request is predicted (S325).

Meanwhile, when there is no acceleration-permitted situation on a route ahead, or an acceleration request does not satisfy any threshold condition, the processor 124 may predict that no upshift request occurs (S330).

For example, the absence of acceleration-permitted situation may be a situation in which a congestion rate of the route ahead exceeds a predetermined value or detailed road information such as a road curvature radius (K) is greater than a curvature radius based on a current speed of the vehicle 100. In addition, a situation of not permitting acceleration may include a driving situation of acceleration not accompanied by upshift or crawling because of a road distance or size of a detailed road structure or a speed limit, even when a congestion rate is low and a curvature radius is adequate.

As shown in FIG. 2, when an upshift request is predicted, and a charge demand required for the battery 102 is greater than an allowable charge amount, the processor 124 may perform processing to control the power consumption of the battery. In this case, the processor 124 may perform the power consumption control of the battery 102 in response to speed-up at an acceleration request that satisfies a threshold condition.

Figure 6:
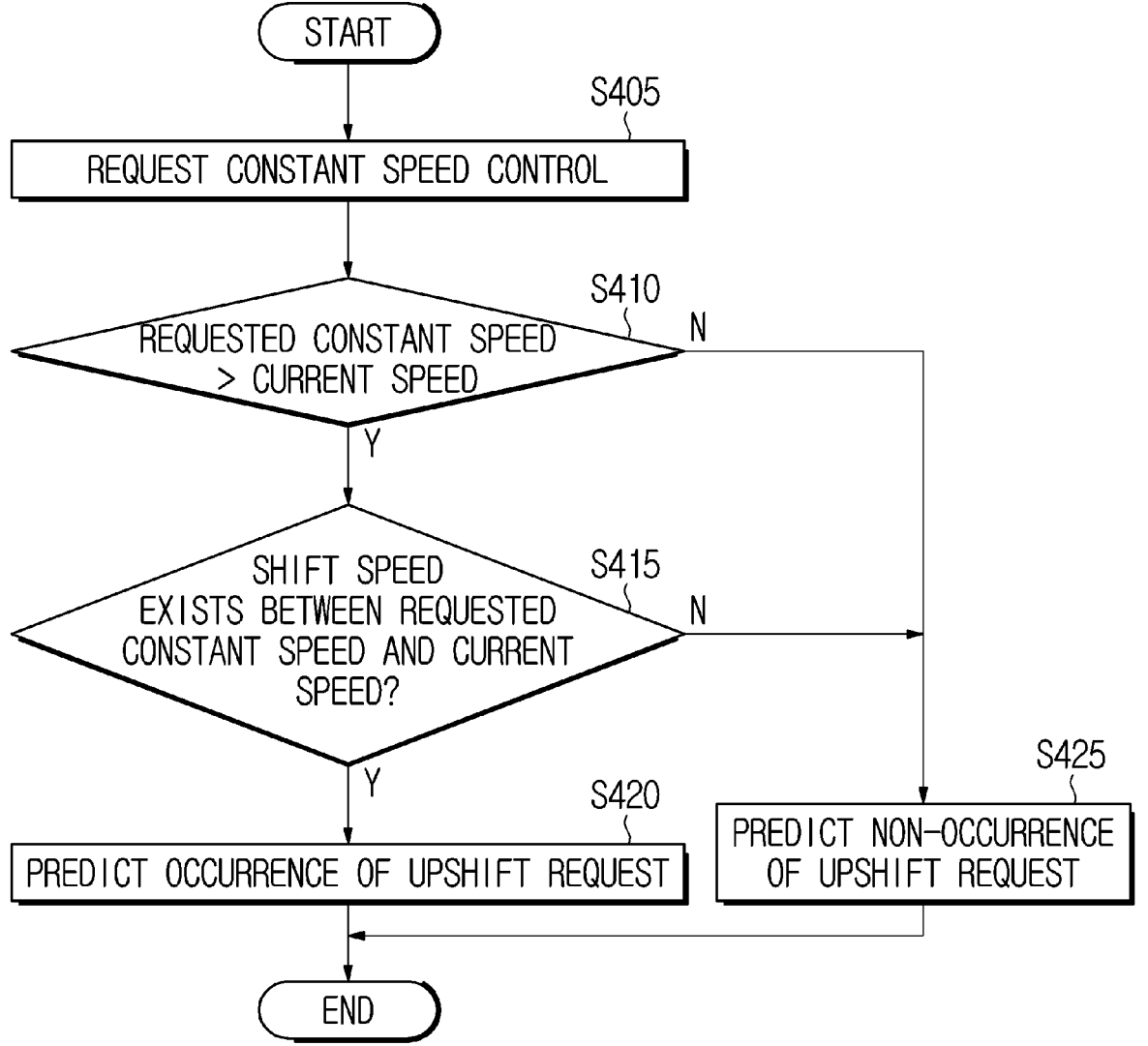
FIG. 6 is a flowchart showing yet another example process of predicting an upshift.

Hereinafter, another example of a prediction process of an upshift according to step S105 of FIG. 2 will be described with reference to FIG. 6. FIG. 6 is a flowchart showing yet another example of a prediction process of the upshift. In the present disclosure, the process of FIG. 6 may be different from that of FIG. 3. The present disclosure may be applicable to the vehicle 100, which may either be on a regular route or a non-regular route.

First, the processor 124 may receive, from a user, a control request for driving the vehicle 100 at a constant speed, that is, a constant speed control request (S405).

For example, a constant speed control request may be generated when a user enables a function like a cruise control. Based on a speed designated by a user and/or a surrounding driving situation, the processor 124 may generate a requested constant speed. Based on constant speed control information, including the information and the speed, the vehicle 100 may be controlled to drive at a constant speed.

Next, the processor 124 may determine whether or not the requested constant speed is higher than the current speed of the vehicle 100 (S410).

In case the requested constant speed is higher than the current speed, the processor 124 may determine whether or not a shift speed is between the requested constant speed and the current speed (S415).

In case the shift speed is between the requested constant speed and the current speed, the processor 124 may determine that the occurrence of an upshift request is predicted (S420).

Meanwhile, if the requested constant speed is equal to or lower than the current speed or if the shift speed does not exist between the requested constant speed and the current speed, the processor 124 may predict that no upshift request will occur (S425).

When the shift speed does not exist between the speeds, it may mean that the shift speed is higher than the requested constant speed or is lower than the current speed.

Figure 7:
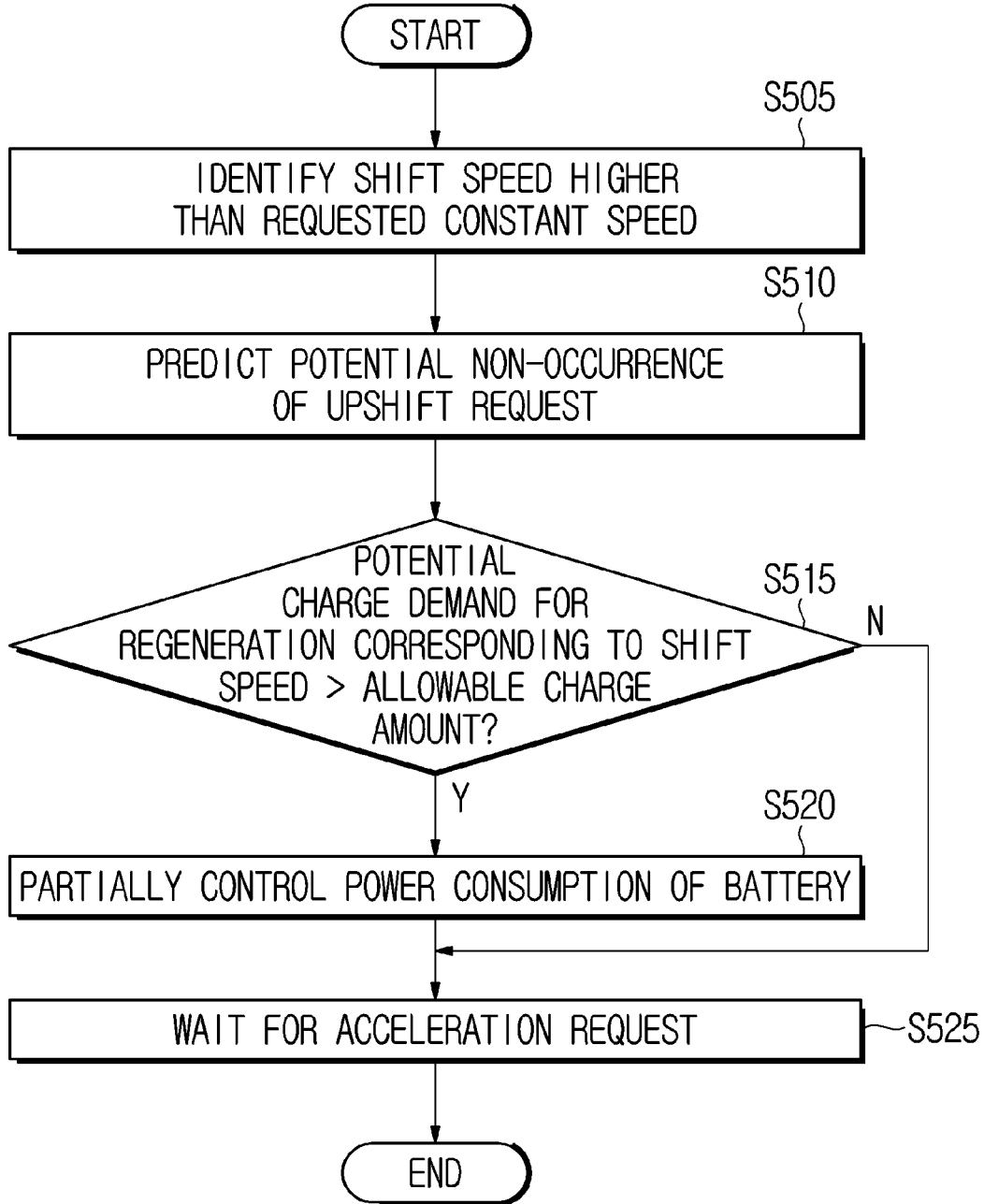
FIG. 7 is a flowchart of another method for shifting according to the present disclosure.

Referring to FIG. 7, yet another example will be described, which may be implemented when a shift speed is higher than the requested constant speed in the step S415 of FIG. 6. In the present disclosure, a shift method for a situation where a requested constant speed is high is described, while the prediction of non-occurrence of upshift request at step S415 is not considered as a final prediction result but is assumed to be a potential non-occurrence prediction. The present disclosure is applicable to the vehicle 100, which may be either on a regular route or a non-regular route.

By step S415 of FIG. 6, the processor 124 may identify that a shift speed is higher than both the requested constant speed and the current speed (S505).

Next, in response to the identification of step S505, the processor 124 may predict that no upshift request will occur (S510).

Next, the processor 124 may determine whether or not a potential charge demand of the battery, which is required for regeneration corresponding to a shift speed, is greater than an allowable charge amount (S515).

In case the potential charge demand is greater than the allowable charge amount, the processor 124 may control the power consumption of the battery 102 (S520).

The power consumption of the battery 102 may be controlled by a power amount based on a difference between the potential charge demand and the allowable charge amount. As an example, a power amount to be consumed may be set to a value equal to or greater than a difference between the potential charge demand and the allowable charge amount. As another example, the power consumption of the battery 102 may be partially controlled so that the power amount to be consumed is smaller than the difference between the potential charge demand and the allowable charge amount.

The processor 124 may select a power-consuming device by considering the power amount to be consumed according to the above-described examples and a required power amount of each device constituting the power-consuming device.

If the potential charge demand is equal to or smaller than the allowable charge amount, the processor 124 may skip step S520 and proceed to step S525.

Next, the processor 124 may wait for an acceleration request for upshift (S525).

For example, an acceleration request may be generated as a requested constant speed is changed to a speed higher than a shift speed or acceleration is made at a level exceeding a user's requested constant speed and shift speed.

According to the present disclosure, the power of the battery 102 may be controlled to be consumed beforehand by considering the possibility that a user controls the vehicle 100 at a speed higher than a requested constant speed, thereby being accompanied by shift, that is, by considering potential upshift. Thus, it is possible to minimize a shift lag that occurs as a potential upshift occurs as an actual shift.

Figure 8A:
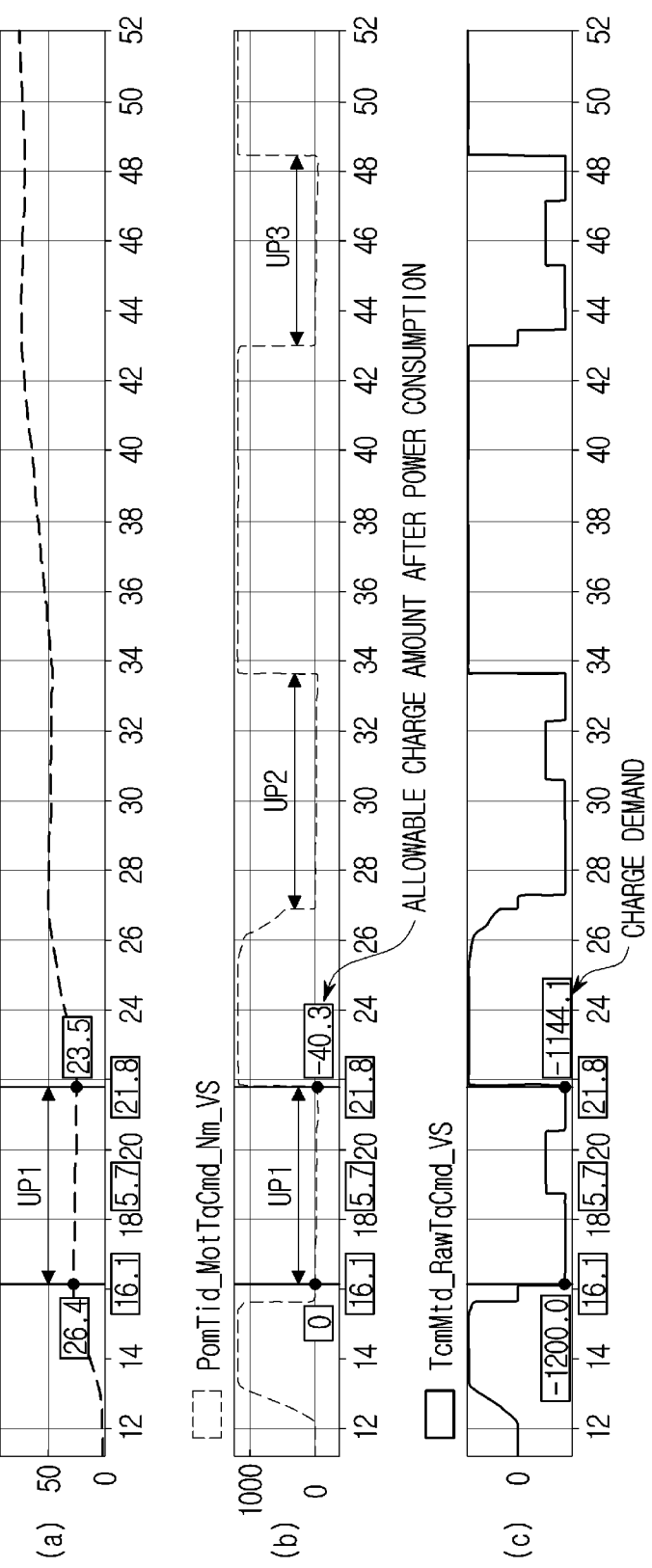
FIG. 8A and FIG. 8B are views showing simulation results of a conventional shift method and a shift method described in the present disclosure, respectively.
Figure 8B:
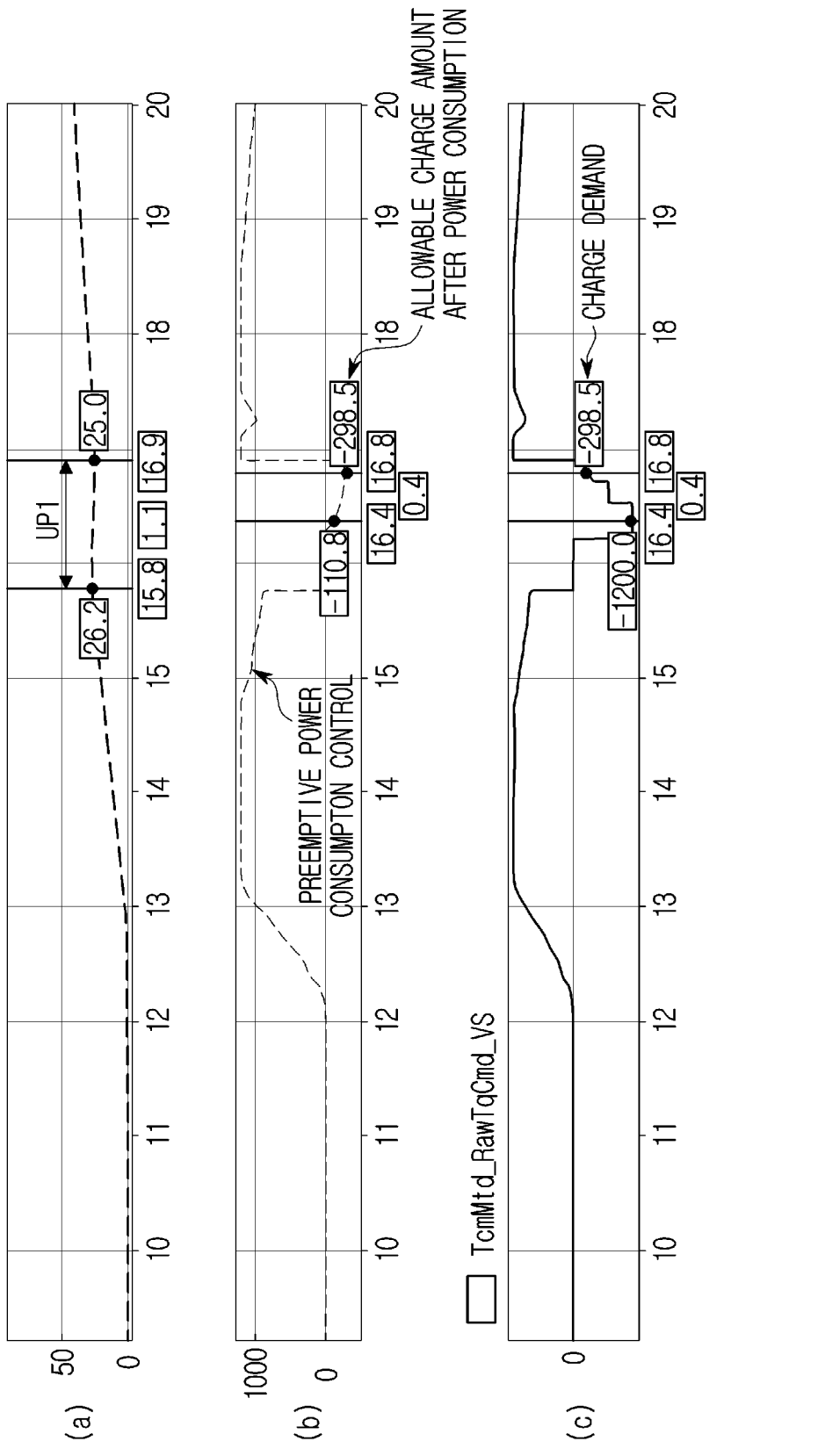

FIG. 8A and FIG. 8B are views showing simulation results according to a conventional shift method and a shift method of the present disclosure, respectively.

FIG. 8A is a result of a conventional shift method under the condition that an allowable charge amount of a battery is −70 kw, the power consumption of a heater, which is a type of a power-consuming device, is 20 kw, and the power consumption of an accessory (device other than the heater), which is another type of a power-consuming device, is 10 kw.

(a) of FIG. 8A shows a motor torque value according to time, (b) of FIG. 8A shows an allowable charge amount of a battery according to time, and (c) of FIG. 8A shows a charge demand of a battery according to time (that is, a charge demand required for a regeneration amount for upshift).

UP1 indicates a section of shifting from first to second gear at an actual shift request, UP2 indicates a section of shifting from second to third gear at an actual shift request, and UP3 indicates a section of shifting from third to fourth gear at an actual shift request.

In the UP1 section, an allowable charge amount is 40.3 kw due to a decrease in the charge limit of a battery. An average charge demand may range from 300 to 500 kw, including an instantaneous demand of 1200 kw.

In the results of (a) to (c) of FIG. 8A, a shift lag in the UP1 section is 5.7 seconds (21.8 seconds-16.1 seconds), which exceeds a reference time of 2 seconds required for a shift at a corresponding level. This is because an allowable charge amount is much smaller than a charge demand.

In a simulation of a shift method associated with FIG. 8B, according to the present disclosure, a battery has an allowable charge amount of −70 kw, and a heater, an accessory, an EHP, and a brake resistor are used as power-consuming devices. A simulation, according to the present disclosure, is performed under the condition that the power consumed by the heater is 40 kw, the power consumed by the accessory is 10 kw, the power consumed by the EHP is 27 kw, and the power consumed by the brake resistor is 30 kw, and FIG. 8B is a result of the simulation according to the present disclosure.

(a) of FIG. 8B shows a motor torque value according to time, (b) of FIG. 8B shows an allowable charge amount of a battery according to time, and (c) of FIG. 8B shows a charge demand of a battery according to time. Besides, in (a) of FIG. 8B, UP1 indicates a section of shifting from first to second gear at an actual shift request.

In (b) and (c) of FIG. 8B associated with the UP1 section, upshift entry is predicted like in the present disclosure, and the power of a battery is controlled to be preemptively consumed through a power-consuming device before an actual request of the upshift.

Accordingly, an allowable charge amount is increased to about 295.8 kw, even if the charge limit of a battery is lowered. A charge demand is approximately 295.8 kw, which has been increased from an instantaneous demand of 1200 kw.

In the results of (a) to (c) of FIG. 8A, a shift lag in the UP1 section is 1.1 seconds (16.9 seconds-15.7 seconds), which is below the reference time of 2 seconds. This is because the power of the battery is preemptively consumed by considering upshift entry before 15.7 seconds, where an actual upshift request occurs. Thus an allowable charge amount corresponding to a charge demand level is secured.

While the exemplary methods of the present disclosure described above are represented as a series of operations for clarity of description, it is not intended to limit the order in which the steps are performed. The steps may be performed simultaneously or in a different order as necessary. In order to implement the method according to the present disclosure, the described steps may further include other steps, may include remaining steps except for some of the steps, or may include other additional steps except for some of the steps.

The various examples of the present disclosure are not a list of all possible combinations and are intended to describe representative aspects of the present disclosure, and the matters described in the various examples may be applied independently or in a combination of two or more.

In addition, various examples of the present disclosure may be implemented in hardware, firmware, software, or a combination thereof. In the case of implementing the present invention by hardware, the present disclosure can be implemented with application-specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

The scope of the disclosure includes software or machine-executable commands (e.g., an operating system, an application, firmware, a program, etc.) for enabling operations according to the methods of various examples to be executed on an apparatus or a computer, a non-transitory computer-readable medium having such software or commands stored thereon and executable on the apparatus or the computer.

The present disclosure is technically directed to provide a shift method using shift entry prediction for minimizing an upshift lag and a vehicle using the method.

Technical objects of the present disclosure are not limited to the above-mentioned technical objects, and other technical objects that are not mentioned will be clearly understood by those skilled in the art through the following descriptions.

According to the present disclosure, there is provided a shift method using shift entry prediction, the method comprising: predicting whether or not an upshift request of a vehicle will occur; determining whether or not a charge demand required for a battery through regeneration for upshift is greater than an allowable charge amount of the battery when the upshift request is predicted; controlling power consumption of the battery when the charge demand is greater than the allowable charge amount; and processing the upshift in response to an actual request of the upshift.

According to the embodiment of the present disclosure in the method, the predicting of whether or not the upshift request will occur may comprise: determining whether or not an acceleration condition accompanied by the upshift is satisfied based on driving pattern information regarding a user of the vehicle, route information related to the route the vehicle traveled in the past, and traffic information during driving of the vehicle; and predicting that the upshift request will occur, when the acceleration condition is satisfied.

According to the embodiment of the present disclosure in the method, the controlling of the power consumption of the battery may comprise: estimating an acceleration point on a driving route based on the driving pattern information, the route information, and the traffic information; and performing power consumption control of the battery before the acceleration point is reached.

According to the embodiment of the present disclosure in the method, the predicting of whether or not the upshift request will occur may comprise: determining whether or not an acceleration-permitted situation accompanied by the upshift exists on the driving route based on driving route information of the vehicle, detailed road information on a driving route, and traffic information during driving of the vehicle; determining whether or not an acceleration request from the user of the vehicle satisfies a threshold condition; and predicting that the upshift request will occur, when the acceleration-permitted situation exists and the acceleration request satisfies the threshold condition.

According to the embodiment of the present disclosure in the method, the detailed road information may include at least one of a speed limit, a lane size, a lane curvature or a road surface condition.

According to the embodiment of the present disclosure in the method, the acceleration request may be based on the user's manipulation of an acceleration module of the vehicle, and the determining of whether or not the acceleration request may satisfy the threshold condition comprises determining that the threshold condition is satisfied, when a manipulation amount of the user is equal to or greater than a threshold value.

According to the embodiment of the present disclosure in the method, the controlling of the power consumption of the battery may further comprise performing power consumption control of the battery in response to speed-up due to the acceleration request that satisfies the threshold condition.

According to the embodiment of the present disclosure in the method, the predicting of whether or not the upshift request will occur further may comprise: determining whether or not a requested constant speed according to a constant speed control request is higher than a current speed of the vehicle; determining whether or not a shift speed exists between the requested constant speed and the current speed when the requested constant speed is higher than the current speed; and determining that occurrence of the upshift request is predicted when the shift speed exists between the requested constant speed and the current speed.

According to the embodiment of the present disclosure in the method, the method may further comprise: predicting that the upshift request will not occur potentially, when the shift speed does not exist between the requested constant speed and the current speed and the shift speed is higher than the requested constant speed; determining whether or not a potential charge demand required for regeneration corresponding to the shift speed is greater than the allowable charge amount; controlling power consumption of the battery, when the potential charge demand is greater than the allowable charge amount; and waiting for an acceleration request for the upshift.

According to the embodiment of the present disclosure in the method, the controlling of the power consumption of the battery may comprise partially controlling the power consumption of the battery to be lower than a difference between the potential charge demand and the allowable charge amount.

According to another embodiment of the present disclosure, there is provided a vehicle processing shift control by shift entry prediction, the vehicle comprising: a motor unit configured to generate a driving force of the vehicle by receiving power from a battery; a shift unit configured to shift the driving force; and a processor configured to control the battery, the motor unit and the shift unit. The processor is configured to: predict whether or not an upshift request of the vehicle will occur, determine whether or not a charge demand required for the battery through regeneration of the motor unit for upshift is greater than an allowable charge amount of the battery, when the upshift request is predicted, control power consumption of the battery, when the charge demand is greater than the allowable charge amount, and process the upshift by controlling the motor unit and the shift unit, in response to an actual request of the upshift.

According to the present disclosure, it is possible to provide a shift method using shift entry prediction for minimizing an upshift lag and a vehicle using the method.

What is claimed is:

1. A method of operating a vehicle, comprising:
predicting whether the vehicle will receive a request for an upshift;
determining whether an amount of regenerative charge that will be produced based on the upshift satisfies an amount of allowable charge that can be transferred to a battery, of the vehicle, at a time point when the vehicle is predicted to receive the request for the upshift;
controlling, based on the amount of regenerative charge satisfying the amount of allowable charge, power consumption of the battery;
after receiving the request for the upshift, processing the upshift;
predicting that the vehicle will not receive a request for a second upshift based on a condition that:
a second shift speed, associated with the second upshift, does not exist between a requested constant speed and a current speed of the vehicle; and
the second shift speed is higher than the requested constant speed;
determining whether an amount of second regenerative charge associated with the second shift speed is greater than the amount of allowable charge; and
controlling, based on the amount of second regenerative charge being greater than the amount of allowable charge, second power consumption of the battery.

2. The method of claim 1, wherein the predicting whether the vehicle will receive the request for the upshift comprises:
determining whether an acceleration condition, associated with the upshift, is satisfied based on one or more of: driving patterns of a user of the vehicle, information associated with past routes traveled by the vehicle, or information associated with traffic near the vehicle; and
predicting the time point based on a second time point when the acceleration condition is satisfied.

3. The method of claim 1, wherein the controlling of the power consumption of the battery comprises:
estimating, based on driving patterns of a user of the vehicle, information associated with past routes traveled by the vehicle, and information associated with traffic near the vehicle, a point, on a current route of the vehicle, where the vehicle will start accelerating; and
performing the controlling of the power consumption of the battery before the point is reached by the vehicle.

4. The method of claim 1, wherein the predicting whether the vehicle will receive the request for the upshift is further based on:
determining, based on information associated with a current route of the vehicle, information associated with a road on the current route, and information associated with traffic near the vehicle, whether an acceleration associated with the upshift is permitted on the current route; and
determining whether a request for acceleration of the vehicle satisfies a threshold condition.

5. The method of claim 4, wherein the request for acceleration is based on a manipulation of an acceleration module of the vehicle by a user of the vehicle, and
wherein the determining whether the request for acceleration satisfies the threshold condition comprises determining that a manipulation amount of the user satisfies a threshold value.

6. The method of claim 4, wherein the controlling of the power consumption of the battery is further based on increased speed of the vehicle caused by the request for acceleration satisfying the threshold condition, and
wherein the information associated with the road on the current route comprises at least one of a speed limit, a lane size, a lane curvature, or a road surface condition.

7. The method of claim 1, wherein the predicting whether the vehicle will receive the request for the upshift is further based on:
determining whether a requested constant speed is higher than a current speed of the vehicle; and
determining whether a shift speed, associated with the upshift, exists between the requested constant speed and the current speed.

8. The method of claim 1, wherein the controlling of the second power consumption of the battery comprises controlling the second power consumption of the battery to be lower than a difference between the amount of second regenerative charge and the amount of allowable charge.

9. A vehicle comprising:
a battery;
at least one motor configured to generate a driving force of the vehicle based on receiving power from the battery;
a transmission configured to shift the driving force; and
a processor configured to:
predict whether the transmission will receive a request for an upshift;
determine whether an amount of regenerative charge that will be produced, by the at least one motor, based on the upshift satisfies an amount of allowable charge that can be transferred to the battery at a time point when the transmission is predicted to receive the request for the upshift;

control, based on the amount of regenerative charge satisfying the amount of allowable charge, power consumption of the battery;

after receiving the request for the upshift, process the upshift by controlling the at least one motor and the transmission;

predict that the transmission will not receive a request for a second upshift based on a condition that:

a second shift speed, associated with the second upshift, does not exist between a requested constant speed and a current speed of the vehicle; and the second shift speed is higher than the requested constant speed;

determine whether an amount of second regenerative charge associated with the second shift speed is greater than the amount of allowable charge; and control, based on the amount of second regenerative charge being greater than the amount of allowable charge, second power consumption of the battery.

10. The vehicle of claim 9, wherein the processor is configured to predict whether the transmission will receive the request for the upshift by:

determining whether an acceleration condition, associated with the upshift, is satisfied based on one or more of: driving patterns of a user of the vehicle, information associated with past routes traveled by the vehicle, and information associated with traffic near the vehicle; and predicting the time point based on a second time point when the acceleration condition is satisfied.

11. The vehicle of claim 9, wherein the processor is configured to control the power consumption of the battery by:

estimating, based on driving patterns of a user of the vehicle, information associated with past routes traveled by the vehicle, and information associated with traffic near the vehicle, a point, on a current route of the vehicle, where the vehicle will start accelerating; and performing the controlling of the power consumption of the battery before the point is reached by the vehicle.

12. The vehicle of claim 9, wherein the processor is configured to predict whether the transmission will receive the request for the upshift further based on:

determining, based on information associated with a current route of the vehicle, information associated with a road on the current route, and information associated with traffic near the vehicle, whether an acceleration associated with the upshift is permitted on the current route; and determining whether a request for acceleration of the vehicle satisfies a threshold condition.

13. The vehicle of claim 12, wherein the request for acceleration is based on a manipulation of an acceleration module of the vehicle by a user of the vehicle, and wherein the determining whether the request for acceleration satisfies the threshold condition comprises determining that a manipulation amount of the user satisfies a threshold value.

14. The vehicle of claim 12, wherein the processor is configured to control the power consumption of the battery further based on increased speed of the vehicle caused by the request for acceleration satisfying the threshold condition, and wherein the information associated with the road on the current route comprises at least one of a speed limit, a lane size, a lane curvature or a road surface condition.

15. The vehicle of claim 9, wherein the processor is configured to predict whether the transmission will receive the request for the upshift further based on:

determining whether a requested constant speed is higher than a current speed of the vehicle; and determining whether a shift speed, associated with the upshift, exists between the requested constant speed and the current speed.

16. The vehicle of claim 9, wherein the processor is configured to control the second power consumption of the battery by controlling the second power consumption of the battery to be lower than a difference between the amount of second regenerative charge and the amount of allowable charge.

17. The vehicle of claim 9, wherein the transmission comprises a plurality of gears and is configured to shift a first gear of the plurality of gears to a second gear of the plurality of gears for the upshift.

18. A vehicle comprising:

a battery;

at least one motor configured to generate a driving force of the vehicle based on receiving power from the battery;

a transmission configured to receive the driving force;

a processor; and a memory storing at least one instruction, wherein the at least one instruction, executed by the processor, is configured to cause the vehicle to:

determine a predicted upshift of the transmission;

determine whether an amount of regenerative charge that will be produced, by the at least one motor, based on the predicted upshift is greater than an amount of allowable charge that can be transferred to the battery;

control, based on the amount of regenerative charge being greater than the amount of allowable charge, power consumption of the battery;

after receiving a request for an upshift, process the upshift by controlling the at least one motor and the transmission; and predict that a request for a second upshift associated with the transmission is not expected based on a condition that:

a second shift speed, associated with the second upshift, does not exist between a requested constant speed and a current speed of the vehicle; and the second shift speed is higher than the requested constant speed.

* * * * *